(12) United States Patent
Khajani et al.

(10) Patent No.: US 10,508,448 B2
(45) Date of Patent: Dec. 17, 2019

(54) TILE AND METHOD OF PRODUCTION

(71) Applicants: Lala Khajani, Glendale, CA (US); Jayer Khajavi, Tujunga, CA (US)

(72) Inventors: Lala Khajani, Glendale, CA (US); Jayer Khajavi, Tujunga, CA (US)

(*) Notice: Subject to any disclaimer, the term of this patent is extended or adjusted under 35 U.S.C. 154(b) by 0 days.

(21) Appl. No.: 15/700,711

(22) Filed: Sep. 11, 2017

(65) Prior Publication Data

US 2019/0078332 A1    Mar. 14, 2019

(51) Int. Cl.

| | |
|---|---|
| *E04D 1/22* | (2006.01) |
| *C04B 28/04* | (2006.01) |
| *E04D 1/14* | (2006.01) |
| *C04B 28/02* | (2006.01) |
| *E04D 1/16* | (2006.01) |
| *B28B 1/52* | (2006.01) |
| *B28B 7/08* | (2006.01) |
| *B28B 7/46* | (2006.01) |
| *C04B 111/00* | (2006.01) |
| *C04B 111/40* | (2006.01) |
| *C04B 111/60* | (2006.01) |
| *E04D 1/30* | (2006.01) |

(52) U.S. Cl.
CPC .............. *E04D 1/22* (2013.01); *B28B 1/525* (2013.01); *B28B 7/082* (2013.01); *B28B 7/46* (2013.01); *C04B 28/02* (2013.01); *C04B 28/04* (2013.01); *E04D 1/14* (2013.01); *E04D 1/16* (2013.01); *C04B 2111/00586* (2013.01); *C04B 2111/40* (2013.01); *C04B 2111/60* (2013.01); *E04D 2001/305* (2013.01)

(58) Field of Classification Search
CPC .................................. E04D 1/14; E04D 1/22
See application file for complete search history.

(56) References Cited

U.S. PATENT DOCUMENTS

| | | |
|---|---|---|
| 3,740,914 A | 6/1973 | Arnaiz Diez |
| 3,841,885 A | 10/1974 | Jakel |
| 3,845,593 A | 11/1974 | Zen |
| 3,869,415 A | 3/1975 | Williams |
| 3,870,777 A | 3/1975 | Jakel |
| 3,943,677 A | 3/1976 | Carothers |
| 4,262,466 A | 4/1981 | Roe |
| D263,256 S | 3/1982 | Morse |
| 4,432,183 A | 2/1984 | Pike et al. |
| 4,514,947 A | 5/1985 | Grail |
| D282,288 S | 1/1986 | Bates |
| 4,729,202 A | 3/1988 | Ferland |
| 4,787,190 A | 11/1988 | Papsdorf |
| 4,914,885 A | 4/1990 | Baker et al. |
| 5,112,408 A | 5/1992 | Melchior |
| D338,541 S | 8/1993 | Fifield |
| 5,268,028 A | 12/1993 | Fifield |
| 5,395,442 A | 3/1995 | Dunton et al. |
| 5,603,758 A | 2/1997 | Schreifels, Jr. et al. |
| 5,743,059 A | 4/1998 | Fifield |

(Continued)

*Primary Examiner* — Babajide A Demuren
(74) *Attorney, Agent, or Firm* — Cohen IP Law Group, PC; Michael N. Cohen

(57) ABSTRACT

A lightweight and strong tile constructed of a composition of cement, cellulous, perlite powder iron oxide and water is disclosed. The cellulous may include recycled paper products such as paper and cardboard that may be shredded. Excess water is removed by a vacuum and the composition is pressed to form a tile.

19 Claims, 6 Drawing Sheets

(56) References Cited

U.S. PATENT DOCUMENTS

| | | |
|---|---|---|
| 5,795,380 A | 8/1998 | Billings et al. |
| D402,064 S | 12/1998 | Hahn |
| 5,941,039 A | 8/1999 | Law |
| 6,233,895 B1 | 5/2001 | Evans et al. |
| D446,871 S | 8/2001 | Thomas |
| D452,920 S | 1/2002 | Alvarez et al. |
| D478,179 S | 8/2003 | Fifield |
| 7,003,922 B2 | 2/2006 | Fifield |
| 7,062,882 B2 | 6/2006 | Porat |
| D538,448 S | 3/2007 | Fifield et al. |
| D562,470 S | 2/2008 | Shepherd et al. |
| D562,993 S | 2/2008 | Shepherd et al. |
| D586,007 S | 2/2009 | Vandewater, Jr. et al. |
| D586,008 S | 2/2009 | Vandewater, Jr. et al. |
| 7,506,477 B2 | 3/2009 | Flaherty et al. |
| D603,070 S | 10/2009 | Day |
| 7,596,919 B1 | 10/2009 | Vande Hey et al. |
| D629,532 S | 12/2010 | Cornett |
| 7,964,272 B2 | 6/2011 | Guevara et al. |
| 8,261,505 B2 | 9/2012 | Kalkanoglu et al. |
| 8,728,609 B2 | 5/2014 | Torres et al. |
| D711,558 S | 8/2014 | Bobolts et al. |
| 9,038,330 B2 | 5/2015 | Bellavia |
| 9,068,762 B2 | 6/2015 | Noton |
| 9,493,952 B2 | 11/2016 | Kalkanoglu |
| 9,518,391 B2 | 12/2016 | Haynes et al. |
| 2002/0020061 A1* | 2/2002 | Billings .................. B28B 1/16 29/897.32 |
| 2002/0152697 A1 | 10/2002 | Hokkirigawa et al. |
| 2003/0061778 A1 | 4/2003 | Fifield et al. |
| 2004/0031222 A1 | 2/2004 | Porat |
| 2004/0040256 A1 | 3/2004 | Bui |
| 2004/0040257 A1 | 3/2004 | Bui |
| 2004/0126602 A1 | 6/2004 | Wallner |
| 2004/0200174 A1 | 10/2004 | Register |
| 2005/0198917 A1 | 9/2005 | Hokkirigawa et al. |
| 2005/0257477 A1 | 11/2005 | Beetler et al. |
| 2008/0057290 A1 | 3/2008 | Guevara et al. |
| 2008/0302025 A1 | 12/2008 | Schriever et al. |
| 2008/0302050 A1 | 12/2008 | Kalkanoglu |
| 2008/0307734 A1 | 12/2008 | Whelan et al. |
| 2009/0004399 A1 | 1/2009 | Haynes et al. |
| 2009/0065972 A1* | 3/2009 | Feigin .................. B28B 13/022 264/241 |
| 2010/0116264 A1 | 5/2010 | Heuschkel |
| 2012/0085053 A1 | 4/2012 | Barone |
| 2015/0152641 A1 | 6/2015 | Torres et al. |
| 2015/0284959 A1 | 10/2015 | Torres et al. |
| 2015/0326170 A1 | 11/2015 | Livsey et al. |
| 2015/0354217 A1 | 12/2015 | Lucas |

* cited by examiner

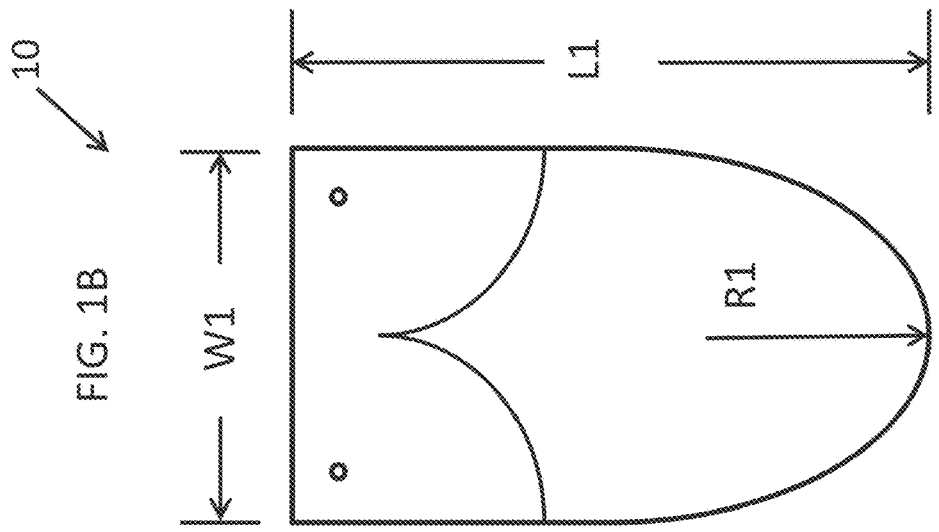
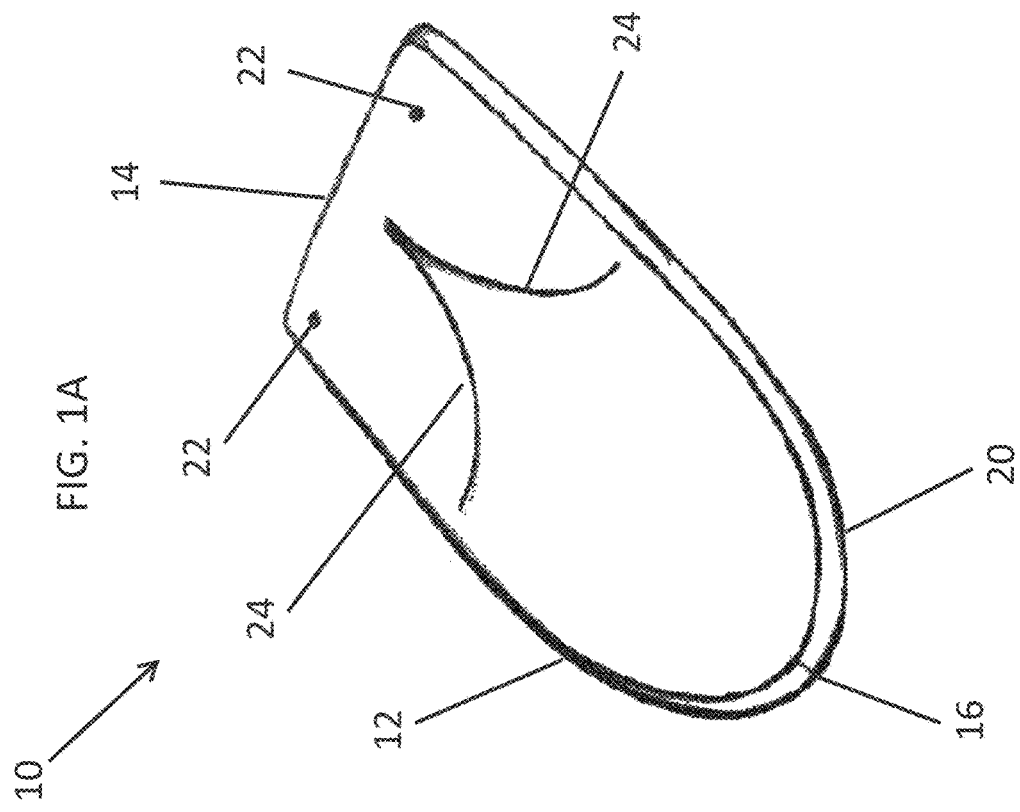

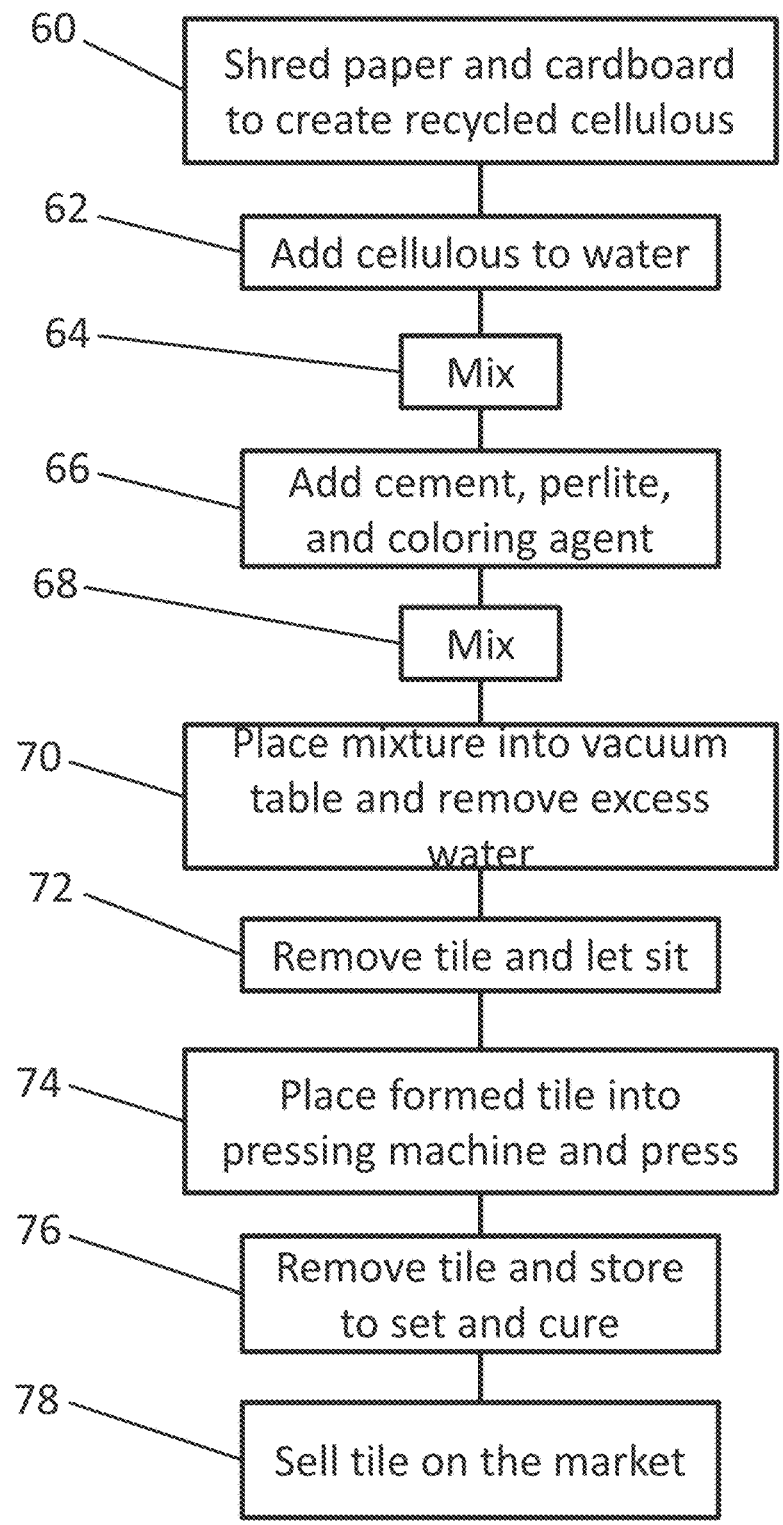

TILE AND METHOD OF PRODUCTION

FIELD OF THE INVENTION

The current invention generally relates to tiles, and more particularly to a lightweight tile that includes recycled ingredients. The invention also relates to a novel method for fabricating a tile.

BACKGROUND OF THE INVENTION

Roofing tiles, floor tiles and other types of tiles and surfaces have been used for quite some time. For example, ceramic tiles, metal tiles, concrete tiles, bituminous tiles, polymer-sand tiles and other types of tiles are commonly used as roofing tiles. In addition, commonly used floor tiles may include travertine tiles, ceramic tiles, porcelain tiles, slate, marble, granite, pebbles and stone tiles, and other types of tiles.

However, many of these tiles are very heavy and therefore costly to transport and difficult to handle and install. Others are prone to breakage and shattering which increases waste and cost. Still others are quite expensive and are therefore not cost effective for a wide portion of the population. In addition, most tiles are not formed of recycled materials and may therefore not be environmentally conscious or eco-friendly.

As such, there is a need for new and innovative tile that may introduce new benefits to the marketplace. For example, there is a need for a tile that may have reduced weight, may be prone to cracking and breakage, and may be made of recycled materials. There is also a need for a method of fabricating said tile.

SUMMARY OF THE INVENTION

In a first aspect of the invention, a lightweight, strong and weather resistant tile with a multitude of benefits is described. The tile may be used in a variety of applications including as a roofing tile, a floor tile, an acoustic tile, a wall tile or any other type of tile or surface. In one aspect of the invention, the tile is described as a flat roof tile and in another aspect of the invention the tile is described as a curved ridge tile.

In another aspect of the invention, the composition and ingredients of the improved tile or surface are described. The compound used to make the tile may include cement, perlite powder, recycled cellulous (in the form of shredded paper and cardboard), a coloring agent such as iron oxide, and water.

In another aspect of the invention, the process through which the tile or surface may be formed using the described ingredients is described. The ingredients may first be mixed together and then placed into a mold configured with a vacuum table to remove a portion of the excess water. The formed tile may then be removed from the vacuum table and placed into a press mold within a press machine to be pressed to a desire pressure. The completed tile or surface may then be stored for a period of time to set and cure before being sold on the market.

In another aspect of the invention, the resulting tile or surface has a wide variety of benefits including reduced weight, increased resilience to cracking and breakage, fire resistance, improved thermal insulation, wider color variety, improved acoustic insulation, improved resilience to extreme weather conditions, and other benefits.

Other aspects of the invention are discussed herein.

BRIEF DESCRIPTION OF THE DRAWINGS

FIG. 1A is a perspective view of a flat roofing tile.
FIG. 1B is a top view of a flat roofing tile.
FIG. 3 is a flow chart representing the steps of a manufacturing process.

DETAILED DESCRIPTION OF THE PREFERRED EMBODIMENTS

Figure 2B:
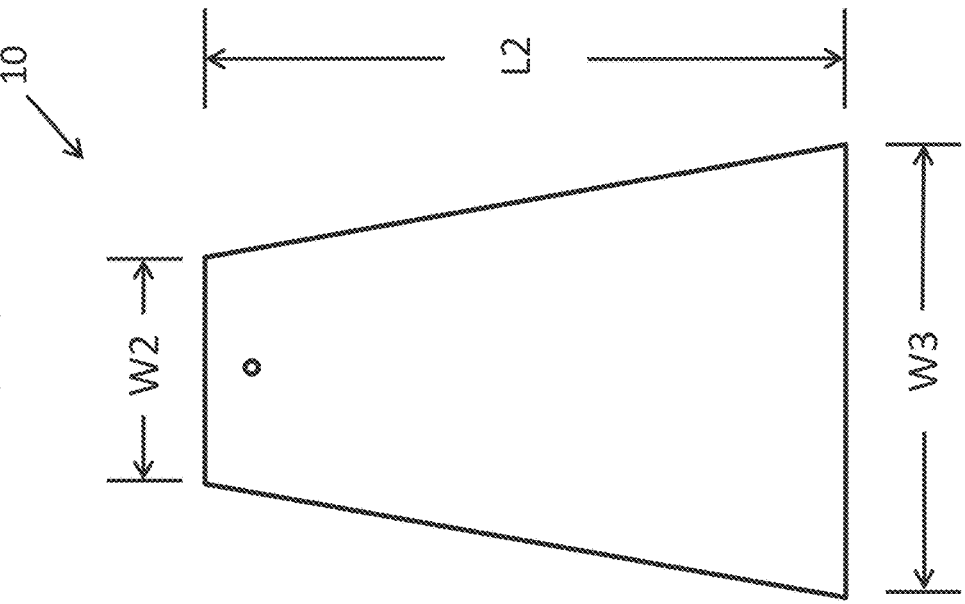
FIG. 2B is a top view of a ridge tile.

The following detailed description is not intended to limit the current invention. Alternate embodiments and variations of the subject matter described herein will be apparent to those skilled in the art.

The tile 10 of the current invention, its composition and the process and apparatus used to manufacture the tile 10 are now described with reference to the figures. Where the same or similar components appear in more than one figure, they are identified by the same or similar reference numerals.

In general, tile 10 is a strong and light weight tile that may be used in a variety of applications. Tile 10 may be produced using ingredients such as water, cellulose, cement, perlite, coloration agents such as iron oxide, and other ingredients. Given the ingredients and the process of manufacture, tile 10 may exhibit a wide variety of benefits over other tiles in the world such as reduced weight, increased resilience to cracking and breakage, fire resistance, improved thermal insulation, wider color variety, improved acoustic insulation, improved resilience to extreme weather conditions, and other benefits. In addition, tile 10 may contain recycled materials such as the cellulose that may comprise of recycled paper or cardboard products.

As such, tile 10 may be used in a wide variety of applications such as:
1) A roofing tile or surface
2) A ceiling tile or surface
3) A floor tile or surface
4) A wall tile or surface
5) An acoustic insulating tile or surface
6) A thermal insulating tile or surface
7) A fire resistant tile or surface
8) A weather resistant tile or surface In addition, tile 10 may be used for other uses and applications, both commercial and residential, not listed above. Also, the term "tile" may be used throughout this specification to describe the invention, however, tile 10 may also include other forms such as a brick, a plate, a block, a shingle, a slate, a plank, a board, a surface, or any other form, layer or surface that may benefit from the characteristics of the invention. As such, the term "tile" used in this specification will be understood to represent any of these forms as well as others known in the art. In addition, tile 10 may be formed in a wide variety of shapes, sizes and dimensions, and the descriptions provided herein should not be construed as limiting tile 10 to any shape, size or dimension, or in any other way.

For example, as depicted in FIGS. 1A and 1B, tile 10 may be a flat tile 12. In one application, flat tile 12 may be used as a roof tile and may include a top end 14, a lower end 16 and edges 18. Top end 14 may be generally flat and lower end 16 may include a rounded or curved section 20 that may include a radius R1 as shown, however, this may not be required. Also note that curved section 20 may be generally circular, oval or may follow any other curvature. Other lower curvatures or shapes such as triangles may also be used. The length of tile 12 is depicted as L1 and the width is depicted as W1. In one example, L1 may equal 0.45 m (1.5 feet), W1 may equal 0.3 m (1 foot), and R1 may equal 0.15 m (6 inches). Other dimensions may also be used as necessary.

The thickness of flat tile 12 may be uniform or may vary across the tile 12. For example, the thickness may be greater towards the top end 14 compared to the lower end 16. In this case, the thickness may linearly decrease from top end 14 to lower end 16 so that the decrease is gradual and spread across the length of the time 12. In this example, the thickness at top end 14 may be 7 mm while the thickness at lower end 16 may be 1.4 mm. Other thicknesses and thickness profiles may also be used. Edges 18 may either be square edges or may include rounded or angled top and/or bottom edges.

In addition, flat tile 12 may include securing holes 22 that may be generally located towards the upper end 14 of the tile 10 to receive fastening members such as nails, screws or other types of fastening members. As such, securing holes 22 may allow a fastening member such as a nail to pass through tile 10 in order to secure tile 10 to the surface below. For instance, in the case where tile 10 may be a roofing tile, securing holes 22 may allow a nail to pass through tile 10 to secure tile 10 to the roof of a building. Holes 22 may include two holes 22 with one hole 22 generally located in the upper left corner of upper end 14 and one hole 22 generally located in the upper right corner of upper end 14 as shown. However, other number of securing holes 22 may be located in other positions on tile 10 as necessary. Securing holes 22 may be 3 mm or other widths.

Flat tile 12 may also include guide lines 24 that may be used to align flat tiles 12 with one another during installation. In the example of flat tile 12 used as a roof tile, tiles 12 may be placed partially overlapping to form a matrix of tiles 12 across the roof of a building. In this scenario, it may be preferable for the lower end 16 of one layer of tiles 12 to overlap with the top end 14 of tiles underneath, and for the layers of tiles 12 to be offset side-to-side by a distance approximately equal to half the width of the tile 12. In this way the lower rounded curvatures of the side-by-side top layer tiles 12 may be aligned with the left and right curved guide lines 24 on the tiles underneath. This allows for easy, quick and uniform placement of the tiles during the installation saving both time and money.

Figure 2A:
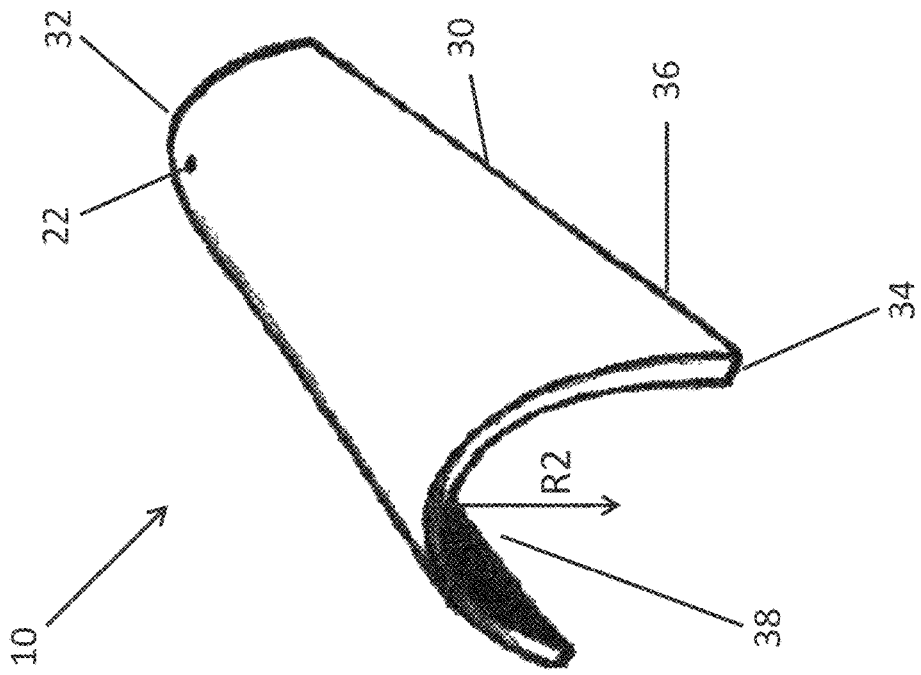
FIG. 2A is a perspective view of a ridge tile.

In another example, tile 10 may be a ridge tile 30 the may also be a roofing tile as depicted in FIGS. 2A and 2B. Ridge tile 30 may have a top end 32, a lower end 34 and edges 36. Ridge tile 30 may also include a curvature 38 with a radius of R2 as depicted in FIG. 2A. The dimensions of ridge tile 30 are represented in FIG. 2B and may include a top width W2, a lower width W3 and a length L2. Width W2 may be less than width W3, for example, W2 may be 0.14 m (6.25 inches) and W3 may be 0.16 m (5.375 inches), but other dimensions may be used. This may allow the top section of one ridge tile 30 to be placed over the lower section of another ridge tile 30 during installation so that the tiles may partially overlap. Edges 36 may either be square edges or may include rounded or angled top and/or bottom edges. In addition, tile 30 may vary in thickness and in one example may be 10 mm thick. Other thicknesses may also be used.

Also, ridge tile 30 may include at least one securing hole 22 that may be positioned towards the upper end 32 of the tile 30 to be used for the same purposes as the securing holes 22 used in relation to the flat tile 12 example above.

As stated earlier, tile 10 may be produced using ingredients such as water, cellulose, cement, perlite, coloration agents such as iron oxide, and other ingredients, and that this may enable tile 10 to exhibit a wide variety of benefits over other tiles. The ingredients, composition and process used to manufacture or otherwise make tile 10 will now be described.

For the example of flat tile 12, to make one tile 12 with the dimensions described above, the ingredients may include:

| Ingredient | Amount | % of whole by weight |
| --- | --- | --- |
| 1) Portland cement type II/V | 850 g | 26.8% |
| 2) Perlite powder | 150 g | 4.7% |
| 3) Cellulose fiber | 150 g | 4.7% |
| 4) Coloring agent | 25 g | 0.8% |
| 5) Water | 2 liters (2 kg) | 63.0% |

Note that the coloring agent may be iron oxide or other types of coloring agents and may also be optional.

In addition, while the table above may show the preferred amount of each ingredient for the flat tile 12, other ranges of amounts for each ingredient may also be used. The table below shows examples of such ranges:

| Ingredient | Amount Range | ~% Range by Weight |
| --- | --- | --- |
| 1) Portland cement type II/V | 850 g-920 g | 21%-32% |
| 2) Perlite powder | 120 g-180 g | 2%-6% |
| 3) Cellulose fiber | 120 g-180 g | 2%-6% |
| 4) Coloring agent | 16 g-25 g | 0%-1% |
| 5) Water | 1.7 kg-2.7 kg | 56%-72% |

Note that the coloring agent may be optional.

For the example of ridge tile 30, to make one tile 30 with the dimensions described above, the ingredients may include:

| Ingredient | Amount | % of whole by weight |
| --- | --- | --- |
| 1) Portland cement type II/V | 600 g | 25.9% |
| 2) Perlite powder | 100 g | 4.3% |
| 3) Cellulose fiber | 100 g | 4.3% |
| 4) Coloring agent | 15 g | 0.6% |
| 5) Water | 1.5 liters (2 kg) | 64.9% |

Note that the coloring agent may be iron oxide or other types of coloring agents and may also be optional.

In addition, while the table above may show the preferred amount of each ingredient for the ridge tile 30, other ranges of amounts for each ingredient may also be used. The table below shows examples of such ranges:

| Ingredient | Amount Range | ~% Range by Weight |
| --- | --- | --- |
| 1) Portland cement type II/V | 600 g-650 g | 21%-32% |
| 2) Perlite powder | 80 g-120 g | 2%-6% |
| 3) Cellulose fiber | 80 g-120 g | 2%-6% |
| 4) Coloring agent | 10 g-15 g | 0%-1% |
| 5) Water | 1.2 kg-2.0 kg | 56%-72% |

Note that the coloring agent may be optional.

FIG. 3 depicts a flowchart that represents the various process steps of making tile 10 as follows:

First, the cellulose may be created using recycled paper products such as paper, cardboard or other types of products that may include cellulous fibers as shown in step 60. The paper and cardboard may be shredded prior to mixing it with the water, and it may be preferable to shred it into a powder-like substance so that it may more readily break down into a pulp-like mixture when added to the water. This may be accomplished through the use of an electric shredder or other device or method. The proportion between paper and cardboard may be 20% paper and 80% cardboard, but other proportions may also be used. In fact, depending on the quality of the recycled paper and cardboard products respectively, and the amount of usable cellulose in each of the products, the proportion between paper and cardboard can range from 10% paper and 90% cardboard, to 90% paper and 10% cardboard.

Next, the shredded cellulous may be added to the water (step 62) and mixed or blended thoroughly (step 64). Note that less than entire amount of water shown above in the ingredients lists above may be added during this step. The mixing may be accomplished manually, by using a hand held mixing device such as an electric drill equipped with a mixing stem, by use of an electric mixer, or by other means. Upon mixing, the shredded cellulous may absorb the water and expand to create a pulp-like mixture. The mixing process may take up to 10 minutes to ensure that all of the cellulous material is thoroughly mixed with the water, but may also be accomplished in lesser amounts of time depending on the mixing device. The pulp mixture may also be transferred from one mixing device into another mixer such as a dough mixer or other type of mixer to continue the mixing process.

Next, the cement, perlite and iron oxide may be mixed together prior to adding it to the pulp or may be added directly to the pulp individually (step 66). Note that Portland cement type II/V may be preferable but other types of cement may also be used. Any remaining amount of water not added in the prior step may next be added to the cellulous pulp mixture along with the cement, perlite and iron oxide. This complete mixture may next be mixed or blended for an additional amount of time (step 68), for example, for two minutes, to create a dough-like material. At this stage, the cement may react with the water in the pulp in a crystallization process called hydration. This process may cure or harden the mixture. The cellulous fibers and the perlite may act as aggregates in the mixture and may be bonded by the curing of the cement. Accordingly, the cellulous fibers may lend reinforcement to tile 10 to improve its ability to withstand mechanical stresses once deployed.

Figure 4A:
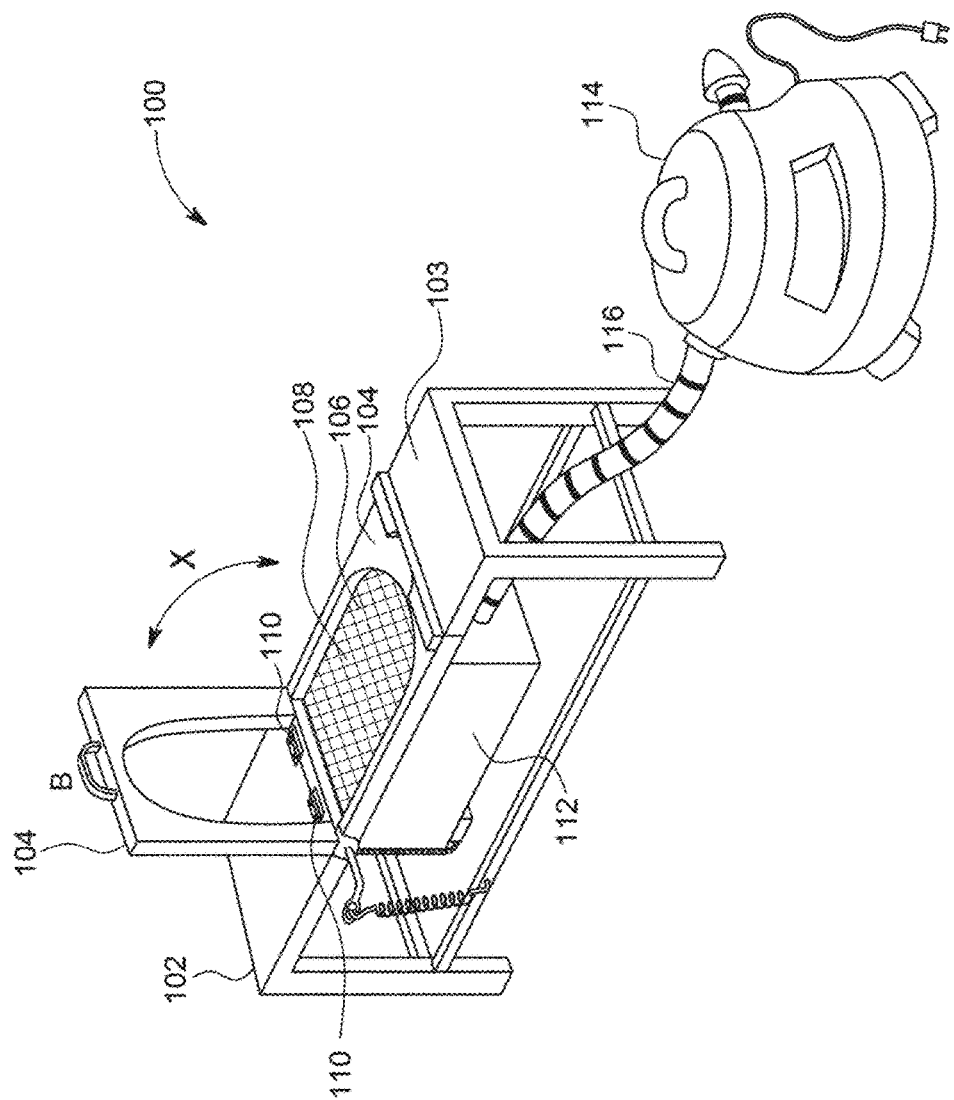
FIG. 4A is a perspective view of a vacuum table.
Figure 4B:
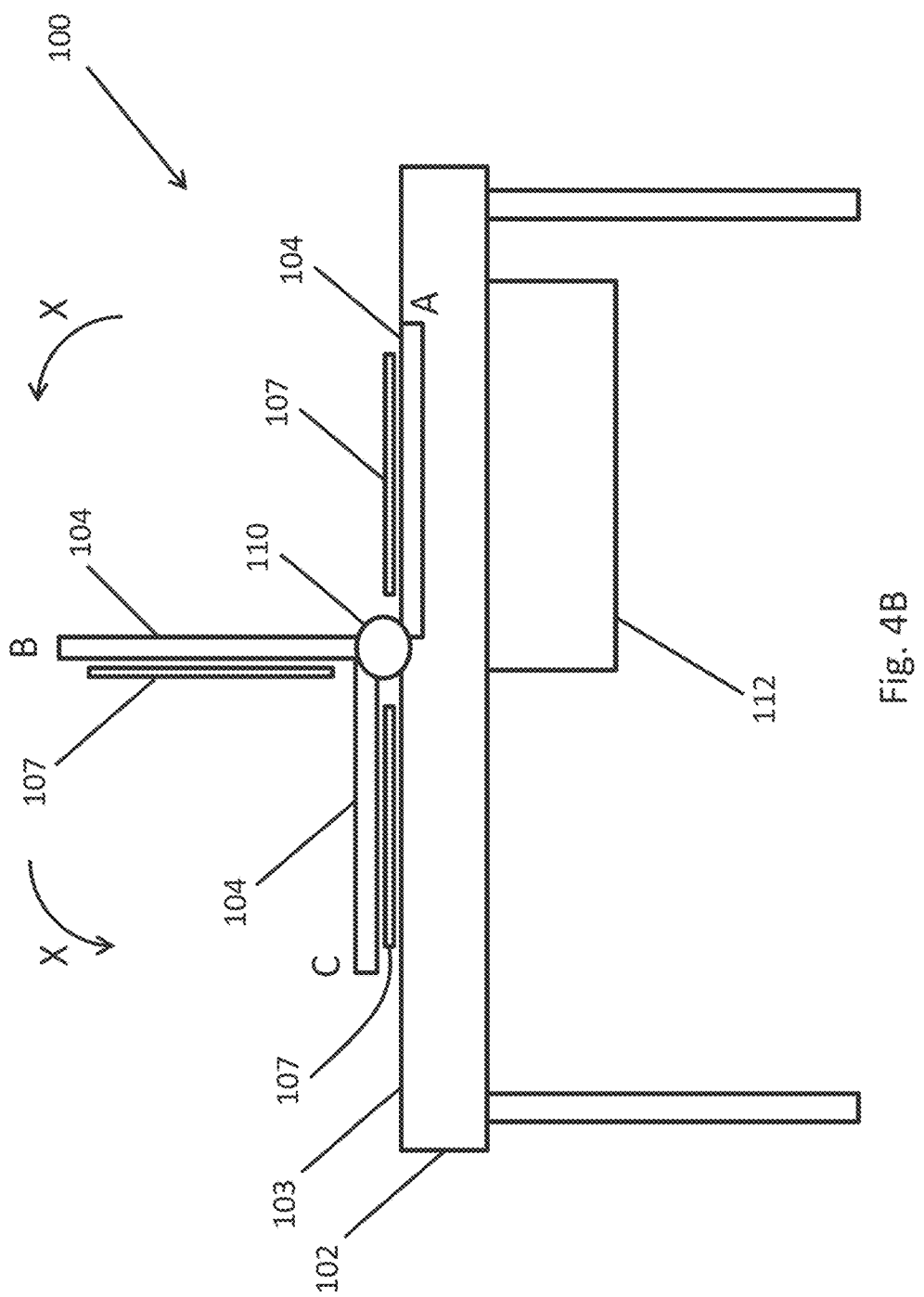
FIG. 4B is a side view of a vacuum table.

The next step of the process (step 70) includes removing a portion of the water from the pulp-like mixture and generally configuring the pulp into the general shape of the desired tile 10. This may be accomplished by using a vacuum table 100 as depicted in FIGS. 4A and 4B. Note that the description below describes a vacuum table generally designed for use in making a flat tile 12, and that vacuum tables designed for use in making other shaped tiles, such as a ridge tile 30, may include modifications that would be obvious to one skilled in the art, and therefore, are also covered in this specification.

Vacuum table 100 may include table 102 with a top 103 and a mold fixture 104 configured with the top 103. Mold fixture 104 may include mold cavity 106 and mesh plate 108. Mesh plate 108 may define the bottom surface of mold cavity 106. Note that mold fixture 104 may rotate in the direction of arrows X about a pivot point defined by hinges 110 from a generally forward down position A, to a generally upright position B, to a generally reverse down position C as depicted in FIG. 4B. Vacuum table 100 may also include a reservoir 112 generally located and configured on the underside of the top 103 of table 102. Table 102 may have a cutout in the top 103 in the area directly above reservoir 112 that mold fixture 104 may generally fit into when in the forward down position. This way, liquid may pass from mold cavity 106 through mesh plate 108 and into reservoir 112. This will be described in further detail below. In addition, reservoir 112 may be connected to vacuum assembly 114 via vacuum tube 116.

With mold fixture 104 configured in the forward down position A, mold cavity 106 may face upward. In this position, the top of mold cavity 106 may be open such that the completed pulp mixture may be added into the cavity 106. It may be preferable that enough pulp mixture be added into mold cavity 106 to generally fill the cavity 106 without additional pulp mixture overflowing the top.

Vacuum assembly 114 may provide vacuum suction to reservoir 112 via vacuum tube 116. In addition, it may be preferable for reservoir 112 to be configured with the bottom surface of table top 103 in a generally air tight fashion so that vacuum suction applied to reservoir 112 from vacuum assembly 114 may be applied to mold cavity 106 without any leaks through the cutout in table top 103 and the mesh plate 108 when the mold fixture 104 is in the forward down position A. This way, water in the pulp mixture may be sucked out of the tile 10 and pass through the mesh plate 108 and into reservoir 112. Note that it may be preferable to configure the mesh plate 108 with a layer of felt or other type of permeable material or filter in the area between the mesh plate 108 and the pulp mixture so that larger particles of the pulp mixture may be blocked by the felt and not pass through the mesh plate 108 and into reservoir 112. It may be a goal of this step to remove approximately 65%-70% of the water from the pulp mixture, but other amounts of water may also be removed. Also, the time it may take to remove this amount of water may range from 30 seconds to 1 minute, 2 minutes, or up to 5 minutes, but it may take other amounts of time as well.

In addition, mold cavity 106 may generally be configured into the general shape of the desired tile 10, in this example, as flat tile 12. Accordingly, as the pulp mixture is placed into the mold cavity 106 and the water is removed as described above, the pulp mixture may take on the general shape and form of the desired tile 10.

To remove the formed tile 10 from the mold cavity 106, a flat galvanized plate 107 generally configured into the shape of the top of the mold cavity 106, and therefore also in the shape of resulting tile 10, may be placed on top of the pulp mixture so that it may be generally aligned with the top of the mold cavity 106. With the galvanized plate 107 held in place, the mold fixture 104 may be rotated into an upright position B and then into a reverse down position C. As the mold fixture 104 is rotated, it may be important for the galvanized plate 107 to be held tight against the outer surface of the pulp mixture within the mold cavity 106 so that the pulp mixture does not fall out. Once the mold fixture 104 is in the reverse down position, the pulp mixture now in the form of tile 10 may rest against the galvanized plate 107 that may in turn rest against the top 103 of the table 102. The mold fixture 104 may then be rotated upward again such that the tile 10 may slip out of the cavity 106 to remain on the galvanized plate 107 as the mold fixture 104 is lifted. At this point, the tile 10 may generally rest upon the galvanized plate 107 and may be at least somewhat solidified such that it may generally retain its shape. The galvanized plate 107 may then be lifted from the table top 103 and may act as a support to assist in moving the tile 10.

As stated above, vacuum table 100 may also be designed to remove water from tiles 10 that may be formed as ridge tiles 30 or other types of tiles 10. In the case of a ridge tile 30, mold cavity 106 may be shaped in the form of the desired ridge tile 30 with its mesh plate 108 having a curvature that may generally match the curvature 38 of the ridge tile 30. In addition, the galvanized plate 107 used with such a vacuum table 100 may also include a curvature similar in the curvature 38 of the ridge tile 30 so that it may support the tile 30 as described in the above section. It can be seen that other shapes, forms and configurations of mold cavity 106 and the galvanized plate 107 may be used to form other types and shapes of desired tiles 10.

In addition, it may be preferable for vacuum table 100 to be configured with multiple mold cavities 106 such that more than one tile 10 may have suction applied to it as described above. This may allow for increased throughput and productivity. Also, note that one or all steps of the process suction process relating to vacuum table 100 may also be automated.

Moving on, the next step in the process may be to place the galvanized plate 107 and tile 10 on a shelf or other surface to sit for several minutes in order to allow further absorption and curing. This period of time may last between one and ten minutes but may be less or more depending on the requirements of the process.

After the tile 10 has set for a few minutes, the next step is to place the tile 10 under pressure. This may be accomplished through the use of a press machine that may apply the pressure through hydraulic, pneumatic, mechanical, electrical, or other methods. In addition, the press machine may be controlled manually or electrically.

Figure 5:
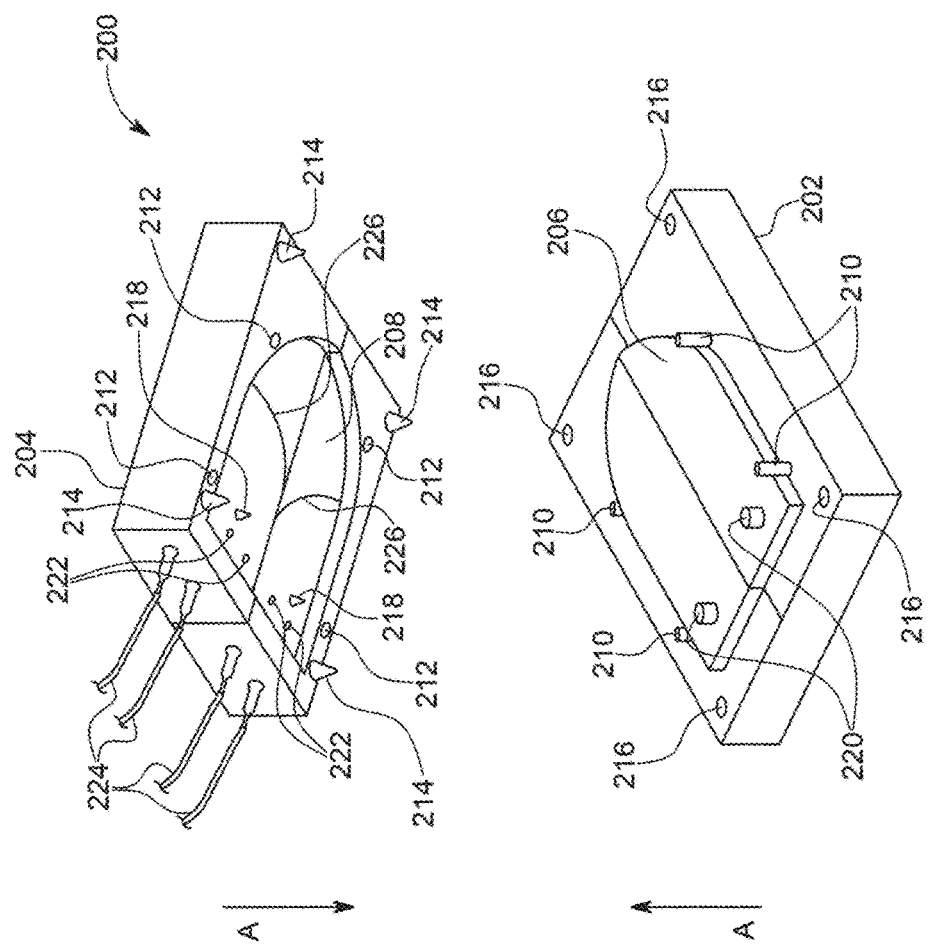
FIG. 5 is a perspective view of a press mold comprising a female section and a male section.

The press machine may also be configured to receive and press one or more press molds 200 that may comprise a male section 202 and a female section 204 as depicted in FIG. 5. Mold 200 may be constructed of aluminum, steel or any other material that may be adequate, and may or may not be coated for protection. Male section 202 may include a raised section 206 that may receive tile 10, and female section 204 may include a cavity 208 that may receive both raised section 206 as well as tile 10 when tile 10 is placed upon raised section 206. Both raised section 206 and cavity 208 may be generally the same size and shape as tile 10 after tile 10 has been removed from mold cavity 106 of the vacuum table 100. In addition, raised section 206 may also be configured to just fit inside cavity 208 without any gaps or open space along the sides. In this way, tile 10 may be placed on raised section 206 and male section 202 may be mated with female section 204 such that tile 10 and raised section 206 may be received by cavity 208. In practice, press mold 200 comprising male section 202 and female section 206 may be configured with the press machine such that the press machine may apply pressure to male section 202 and female section 204 in the direction of arrows B in FIG. 5. This way, with tile 10 received into cavity 208, the desired amount of pressure may be applied to tile 10 by the press machine.

Male section 202 may also include alignment pins 210 that may extend slightly above the surface of raised section 206 and that may be positioned around the edges of raised section 206 as depicted in FIG. 5. These alignment pins 210 may assist in aligning tile 10 onto raised section 206, and while four alignment pins 210 are shown in FIG. 5, any number of alignment pins 210 may be used. In addition, female section 204 may include alignment pin holes 212 that may receive alignment pins 210 when cavity 208 may receive raised section 206 and tile 10.

Also, female section 204 may include guide pins 214 and male section 202 may include guide pin holes 216 that may receive guide pins 214 when female section 204 may be mated with male section 202. These guide pins 214 and guide pin holes 216 combinations may assist in properly aligning and mating female section 204 with male section 202. Note that while four guide pins 214 and four guide holes 216 are depicted in FIG. 5, any number of guide pins 214 and guide holes 216 may be used. It should also be noted that the male section 202 may include one or all of the guide pins 214 and that the female section 204 may include one or all of the guide pin holes 216.

In addition, cavity 208 may include nail hole pins 218 that may puncture tile 10 as tile 10 is pressed between raised section 206 and cavity 208. This may create nail holes 22 in tile 10 as depicted in FIGS. 1A and 1B. In one example, the nail hole pins 218 may be 3 mm in diameter to generally create nail holes 22 of the same width. However, other diameters may also be used. It may also be preferable that raised section 206 may include nail hole pin holes 220 that may receive nail hole pins 218 when male section 202 and female section 204 are mated and pressed together by the press machine. It should be noted that the number of nail hole pins 218 and nail hole pin holes 220 may vary depending on the type of tile 10 being produced and the desired number and location of the resulting nail holes 22. It should also be noted that raised section 206 may include one or all of the nail hole pins 218 and that the cavity 208 may include one or all of the nail hole pin holes 220.

In addition, cavity 208 may also include raised ridges 226 that may slightly press into the top surface of tile 10 when tile 10 is pressed within mold 200. This may leave visible lines on the top surface of tile 10 that may be used later as alignment marks or lines when the completed tile 10 is being installed. In the example of the flat tile 14 above, these raised ridges may be curved or pulvinated to result in guide lines 24 as depicted in FIGS. 1A and 1B. It may be preferable that raised ridges 226 be tall enough to leave visible marks on tile 10 but not too tall as to compromise the physical strength or integrity of tile 10.

An example procedure for pressing tile 10 with the press machine will now be described. It should be noted however that other steps or procedures may also be followed that may result in the same outcome. First, with the press machine open, the male section 202 and the female section 204 may be configured to be utilized by the press. In this configuration, male section 204 may be positioned beneath female section 206 with enough room between male section 202 and female section 204 to allow for tile 10 to be placed on raised section 206 and aligned with alignment pins 210. Note that the galvanized 107 plate may be placed onto the raised section 206 underneath the tile 10 or it may be removed. It may also be preferable that male section 202 is vertically aligned with female section 204 such that when the press machine is closed and the male section 202 and the female section 204 are mated, that guide pins 214 may be received by guide pin holes 216 to ensure that the sections 202, 204 are properly aligned and mated.

The press machine may then be controlled to apply pressure to mold 200 and therefore to tile 10 within mold 200. It may be preferable to apply 175 psi-200 psi or 225 psi-250 psi but other pressures may also be used. In addition, the press machine may apply the pressure for approximately 20 seconds, but other amounts of time may also be used.

After the tile 10 has been pressed for the desired amount of time, the press machine may be opened and the tile 10 may be removed. It may be preferable for cavity 208 to include air holes 222 that may lead to air lines 224 that may provide pressurized air into cavity 208 to force tile 10 out of the cavity. The applied air pressure necessary to remove tile 10 from cavity 208 may be approximately 140 psi but other pressures may also be used. In addition, it may also be preferable to have a thin sheath between to the top of tile 10 within the cavity 108 and the air holes so that the air pressure is applied to the sheath and not to the top of the tile 10 directly. This may protect the tile 10 from being deformed by the applied air pressure and may allow the air pressure to be applied more evenly and uniformly across the top of the tile 10.

After pressing, the completed tile 10 may be moved to a shelf or other suitable surface to further set and cure before selling the tile on the market. This may be accomplished at a nominal room temperature of approximately 20 to 25 degrees Celsius. Note that it may or may not be resting on the galvanized plate 107 during this time depending on whether or not the galvanized plate 107 was included in the pressing step. The amount of time the completed tile 10 may further set and cure before being ready for market may depend on the dimensions and exact composition of the tile 10, but an approximate time period may be one week or less, or up to three weeks or more. However, other amount of time may also be used.

It should be noted that the press machine as described above may be configured to include more than one press molds 200 so that more than one tile 10 may be pressed at a time. In addition, one or all steps relating to pressing tile 10 with the press machine may also be automated to increase throughput and productivity.

The composition and process of manufacturer described above forms a compound that has a wide variety of benefits and product applications compared to other compounds used on the market. For instance, when used to form roof tiles, the resulting roof tiles using the compound described in this specification may be up to 50% less weight than standard ceramic roof tiles on the market. This may reduce the cost of transportation as well as allow for the tiles to be more easily handled and installed. In addition, because the cellulous fibers used in their construction bond with the cement and perlite to reinforce the tile 10 during the curing process, the tiles 10 are less prone to cracking and shattering than other tiles on the market. This allows for less breakage during transportation, handling and installation thus saving time and money. This quality also allows the tiles 10 to be installed using nail guns whereas other tiles may shatter or crack when installed by such a device. It can be understood that the head of the nail may apply a strong force to the tile 10 when the nail is forced through the nail holes 22 by the nail gun, and that may cause other tiles to crack or shatter. However, because of tile's 10 resistance to shattering or breakage, it may withstand this force. The use of a nail gun to install tile 10 may reduce the time and labor of installation compared to other tiles that are required to be installed manually with a hammer and nail thus saving money. Also, this resistance to breakage also allows the tiles to be walked up without breaking such that workers installing solar panels on roofs consisting of tiles 10 may need not worry about stepping on and breaking the tiles 10. In addition, this also allows tiles 10 to be used as floor tiles 10, as stair tiles 10, as other types of floor surfaces or in any other application that may be beneficial.

In addition, the composition of tile 10 also allows tile 10 to have improved thermal insulating attributes compared to other tiles on the market. Tile 10 is also fireproof, water proof and will not absorb water, and is therefore resistant to harsh or extreme weather.

Also, the composition of tile 10 allows for tile 10 to be more easily cut and trimmed to size during installation, thus improving ease of installation and reducing waste. In addition, because the coloring agent, for example iron oxide, is added during the mixing process, it is not painted, sprayed or otherwise applied to the surface of the tile 10 and is therefore longer lasting and looking new for a longer period of time. This also allows for a wider selection of colors for tile 10 as most any coloring agent can be used during the mixing process.

It must also be noted that because the compound is made using recycled paper and cardboard, the resulting tiles 10 may be more environmentally conscious than other tiles that do not utilized recycled materials. In addition, the ingredients used to make the compound that may be used to make tile 10 are also non-toxic and safe.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A lightweight tile constructed of a composition comprising:
   cement in the amount of 21%-32% by weight;
   cellulous in the amount of 4%-6% by weight;
   perlite powder in the amount of 2%-6% by weight; and
   water in the amount of 56%-72% by weight.

2. The tile of claim 1, further comprising a coloring agent in the amount of 0.1%-1.0% by weight.

3. The tile of claim 2, wherein the coloring agent is iron oxide.

4. The tile of claim 1, wherein the cellulous comprises recycled paper products.

5. The tile of claim 4, wherein the recycled paper products comprise a mixture of paper and cardboard.

6. The tile of claim 1, wherein the tile is a roof tile.

7. The tile of claim 1, wherein the tile is a floor tile.

8. A method of constructing a lightweight tile, the method comprising:
   providing a dry mixture comprising cement in the amount of 21%-32% by weight, cellulous in the amount of 2%-6% by weight, and perlite powder in the amount of 2%-6% by weight;
   blending said dry mixture with water in the amount of 56%-72% by weight, thereby providing a tile composition;
   removing excess water from the tile composition;
   forming said composition into the shape of a tile;
   pressing said tile shape at a pressure; and
   allowing the tile shape to air dry at a temperature.

9. The method of claim 8, wherein the dry mixture further comprises iron oxide in the amount of 0.1%-1.0% by weight.

10. The method of claim 8, wherein the cellulous comprises recycled paper products.

11. The method of claim 10, wherein recycled paper products comprise a mixture of paper and cardboard.

12. The method of claim 11, wherein the paper and the cardboard is shredded prior to being added to the dry mixture.

13. The method of claim 8, wherein the excess water is removed from the composition by a vacuum.

14. The method of claim 8, wherein the tile shape is pressed within a press mold.

15. The method of claim 14, wherein the press mold is pressed by a press machine.

16. The tile of claim 1, wherein the tile is fiberglass free.

17. A fiberglass free tile constructed of a composition comprising:
    cement in the amount of 21%-32% by weight;
    cellulous in the amount of 2%-6% by weight;
    perlite powder in the amount of 2%-6% by weight; and
    water in the amount of 56%-72% by weight.

18. The tile of claim 17, further comprising a coloring agent in the amount of 0.1%-1.0% by weight.

19. The tile of claim 17, wherein the cellulous comprises recycled paper products.

* * * * *